United States Patent
Thompson et al.

(10) Patent No.: US 6,371,261 B1
(45) Date of Patent: Apr. 16, 2002

(54) MOLYBDENUM ALLOY ELEVATOR SAFETY BRAKES

(75) Inventors: Mark S. Thompson, Tolland; James T. Beals, West Hartford; Philip H. McCluskey, Manchester; David W. McKee, Somers; Michael C. Lang, Naugatuck; Fred J. Lussier, Hebron; Joseph A. L. LeDoux, Plantsville; Dat T. Nguyen, West Hartford; Paul Bennett, Waterbury, all of CT (US)

(73) Assignee: Otis Elevator Company, Farmington, CT (US)

( * ) Notice: Subject to any disclaimer, the term of this patent is extended or adjusted under 35 U.S.C. 154(b) by 299 days.

(21) Appl. No.: 08/965,180

(22) Filed: Nov. 6, 1997

(51) Int. Cl.⁷ ............................................... F16D 69/00
(52) U.S. Cl. ..................... 188/250 G; 187/370; 187/375
(58) Field of Search .................. 188/251 M, 251 A, 188/250 G, 59, 166, 184, 188; 187/367, 370, 374, 375, 376

(56) References Cited

U.S. PATENT DOCUMENTS

| 2,678,271 A | | 5/1954 | Ham et al. |
| 2,713,923 A | * | 7/1955 | Eksergian et al. ...... 188/251 A |
| 2,960,403 A | | 11/1960 | Timmons et al. |
| 3,841,949 A | * | 10/1974 | Black .................... 188/251 M |
| 3,871,934 A | * | 3/1975 | Marin .................... 188/251 A |
| 3,897,582 A | | 7/1975 | Olcott .......................... 428/114 |
| 4,146,654 A | | 3/1979 | Guyonnet ....................... 427/34 |
| 4,351,885 A | | 9/1982 | Depoisier et al. ........... 428/544 |
| 5,163,526 A | | 11/1992 | Morgun et al. ............. 188/250 |
| 5,503,257 A | | 4/1996 | Sugita et al. ............... 188/251 |
| 5,819,879 A | * | 10/1998 | Lang et al. ................. 187/376 |

FOREIGN PATENT DOCUMENTS

| GB | 1560042 | 1/1980 |
| GB | 2261480 | 5/1993 |
| GB | 2274827 | 8/1994 |
| GB | 2287451 | 9/1995 |

OTHER PUBLICATIONS

"Zirconium–Molybdenum Article".
"The Science and Technology of Tungsten, Tantalum Molybdenium, Niobium and Their Alloys", Authors: B. Natter and R. Machenschalk, Published: 1964.

* cited by examiner

*Primary Examiner*—Pam Rodriguez

(57) ABSTRACT

An elevator safety brake for stopping an elevator car is provided with a brake shoe having a molybdenum alloy friction surface for contacting an elevator guide rail surface to provide a stopping force. The molybdenum alloy contains 99.4 weight percent molybdenum, 0.5 weight percent titanium and 0.1 weight percent zirconium. The friction surface of the brake formed from the alloy exhibits a consistent high friction and low wear suitably accommodating high speed, high load elevators installed in very tall buildings.

11 Claims, 2 Drawing Sheets

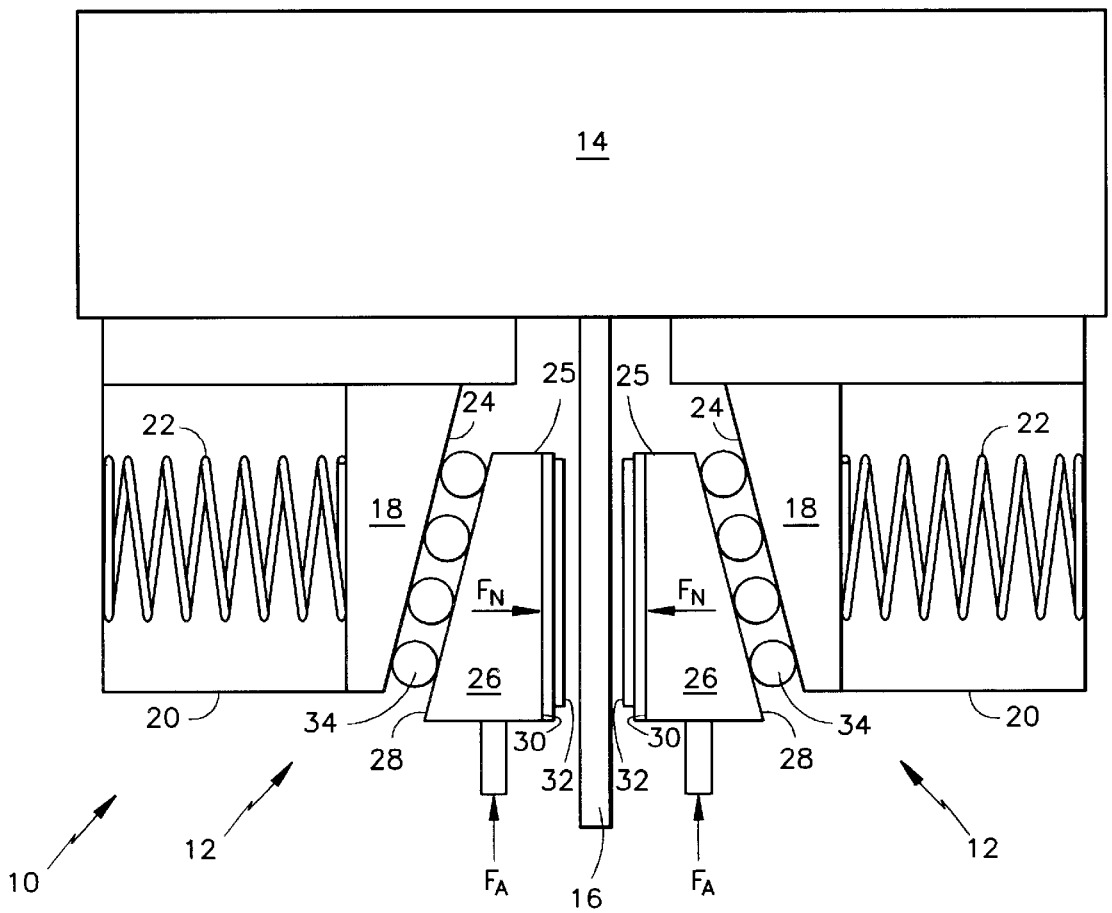
FIG. 1
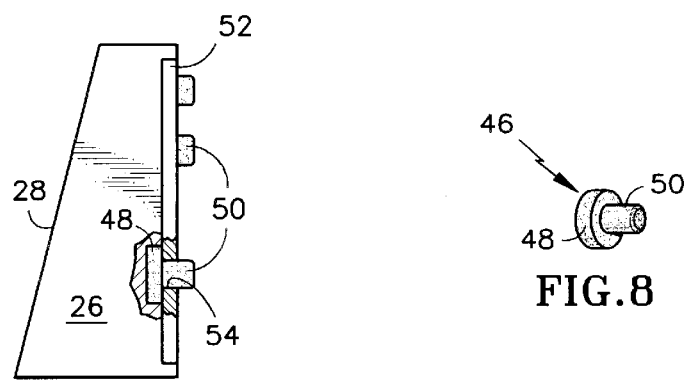
FIG. 7
FIG. 8

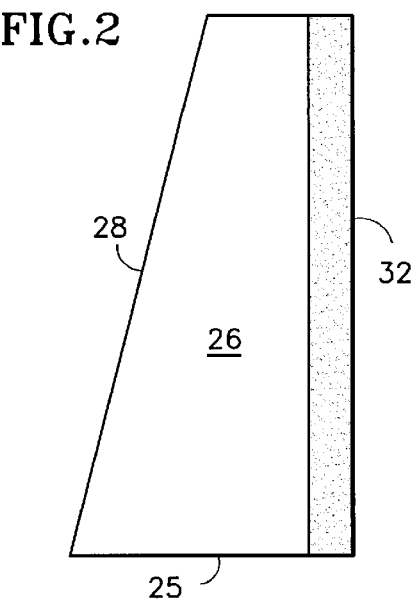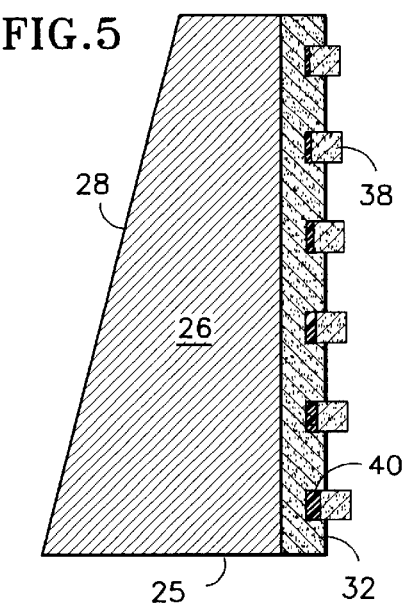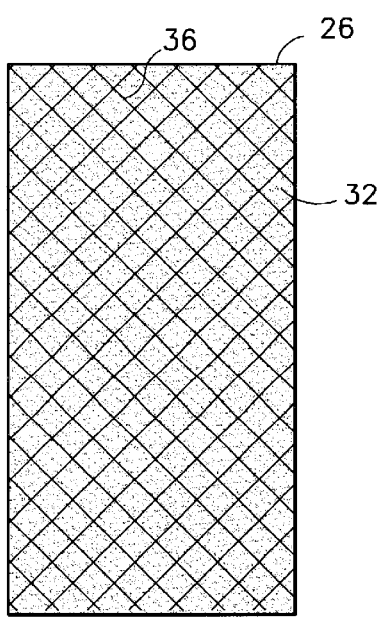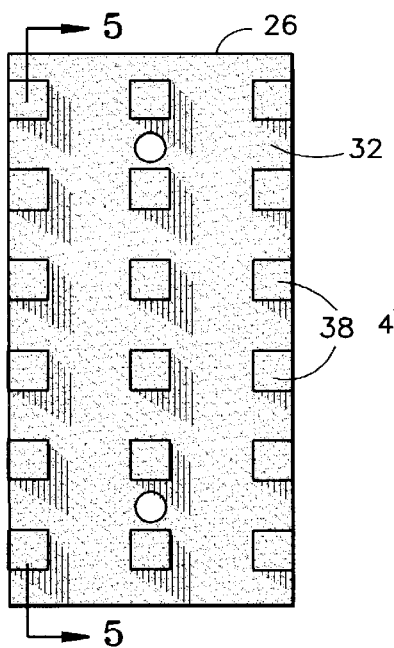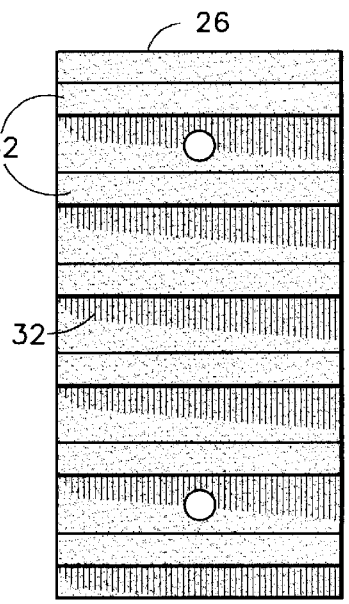

MOLYBDENUM ALLOY ELEVATOR SAFETY BRAKES

BACKGROUND OF THE INVENTION

1. Field of the Invention

The present invention generally relates to a safety braking system for slowing or stopping a vertically moving object, such as an elevator car, in an over speed condition. More particularly, the present invention relates to an elevator safety brake system for slowing or stopping an elevator car having a molybdenum alloy friction surface.

2. Description of the Prior Art

A typical safety braking system is attached to an elevator car and comprises a pair of wedge shaped brake shoes having substantially flat frictional surfaces. The flat frictional surfaces are ordinarily positioned on opposite sides of the stem portion of a T shaped guide rail supported on an elevator hoistway wall. These wedge shaped brake shoes are activated by a governor mechanism which forces the wedge shaped brake shoes along an adjacent guide shoe assembly which in turn forces the frictional surfaces of the brake shoes to make contact with the guide rail to slow or stop the car.

In a typical safety braking system, the wedges may be loaded with up to approximately 56,000 lb (250,000 N) normal force by applying approximately 8000 psi over a 7 $in^2$ surface (55,000 kPa×0.0045 $m^2$)). Using cast iron frictional surfaces having a nominal coefficient of friction with respect to the guide rail at approximately 6 m/s of approximately 0.15, the 56,000 lb (250,000 N) force acting upon a wedge creates a frictional force of approximately (11,200 lb (50,000 N) on the frictional surface of the wedge. In a conventional elevator cab design using cast iron frictional surfaces, there are four frictional surfaces which generate a total potential stopping force of approximately 45,000 lb (200,000 N).

As very tall buildings are built, high speed, high load elevators (typically 4 to 8 ml/s but up to 12.5 m/s) have become necessary to service the numerous floors in such buildings. Such elevators have a load rating of up to about 16,000 kg. The safety breaking requirements of such elevators have become increasingly demanding. It has been determined that conventional gray cast iron cannot operate as a consistent friction material at high speeds and loads required by such modern elevator systems due to breaking failures caused by excessive wear and a reduced coefficient of friction caused by high frictional heating. Accordingly, there is a need for elevator safety brake shoes made with alternative friction materials which provide low wear and consistent high friction to accommodate the high speeds and loads of elevators installed in very tall buildings.

SUMMARY OF THE INVENTION

It is an object of the present invention to provide an elevator safety brake for stopping an elevator car.

It is another object of the present invention to provide a reliable elevator safety brake having a consistent high coefficient of friction and low wear for use in high speed, high load elevators.

These objects are accomplished, at least in part, by an elevator safety brake having a brake shoe formed from a base and a friction surface attached to the base for contacting an elevator guide rail surface. At least a portion of the friction surface comprises an alloy material formed from approximately 99.4 weight percent molybdenum, 0.5 weight percent titanium and 0.1 weight percent zirconium. The safety brake is provided with an actuator for pressing the friction material of the brake shoe against the guide rail surface to stop the elevator car.

BRIEF DESCRIPTION OF THE DRAWINGS

The drawings, not drawn to scale, include:

FIG. 1, which is a simple schematic illustration of an elevator safety brake system with two friction wedges positioned on opposite sides of a guide rail;

FIG. 2, which is a simple schematic illustration of an elevator safety brake having a molybdenum alloy friction plate applied to the rail facing surface of the shoe base;

FIG. 3, which is a simple schematic illustration of the embodiment of FIG. 2 further including a cross hatch pattern machined therein;

FIG. 4, which is a simple schematic illustration of an alternative embodiment of the present invention showing a plurality of molybdenum alloy friction tiles attached to the rail facing surface of the shoe base;

FIG. 5, which is a simple cross-sectional view of the embodiment illustrated in FIG. 4, taken along the line 5—5 to illustrate the attachment of the friction tiles via a compliant material;

FIG. 6, which is a simple schematic illustration in which the molybdenum alloy friction material is attached to the base of the brake shoe in the form of a plurality of pins;

FIG. 7, which is a simple cutaway schematic illustration in which the molybdenum alloy friction material is attached to the base of the brake shoe in the form of a plurality of buttons held by a plate; and FIG. 8, which is a simple isometric view of a button.

DETAILED DESCRIPTION OF THE INVENTION

FIG. 1 provides a simplified schematic illustration of a known elevator safety brake system upon which the present invention may be used. The brake system 10 comprises a pair of actuators 12 which are attached to an elevator car 14 and positioned in an opposing relationship about a guide rail 16 supported in an elevator hoistway (not shown). The actuators 12 are formed, in part, by a wedge shaped guide shoe 18 which is movable within housing 20 in a direction which is generally perpendicular to the guide rail 16. The guide shoe 18 is biased towards the guide rail 16 by spring 22. The guide shoe 18 has an inclined support surface 24. A wedge shaped brake shoe 25 having base 26 is provided with an inclined guiding surface 28 which is complimentary to the inclined support surface 24 of the guide shoe 18. The brake shoe 25 is also provided with a rail facing surface 30. The brake shoe 25 is positioned between the guide shoe 18 and the rail 16. A brake pad 32 having a high friction material is attached to the rail facing surface 30 of the brake shoe base 26. A roller cage assembly containing a plurality of rollers 34 is positioned between the inclined support surface 24 of the guide shoe 18 and the complimentary inclined guide shoe facing surface 28 of the brake shoe 25. The rollers 34 provide a low friction contact between the complimentary inclined adjacent surfaces 24 and 28 of the guide shoe 18 and the brake shoe 25, respectively. The guide shoe 18, biased by spring 22, applies normal force $F_N$ in the direction of the rail 16 on brake shoe 25 through rollers 34.

In an emergency situation wherein the application of the brake system 10 is desired, a force $F_A$ in the direction of the elevator car 14 is applied to the base 26 of the wedge shaped brake shoes 25 which causes the shoes 25 to move towards the elevator car 14. Ordinarily, force $F_A$ is supplied by a rope, cable or mechanical linkage connected to a governor (not shown). The inclined complimentary surfaces 24 and 28 of the guide shoe 18 and the brake shoe base 26, respectively, cause the brake shoe 25 to move towards the rail 16 until contact between the pad 32 and the rail 16 is made. As those skilled in the art will appreciate, the pad 32 is applied to the rail 16 with normal force $F_N$ supplied by the spring 22. The amount of braking force developed by normal force $F_N$ is substantially and directly proportional to the friction coefficient $\mu_k$ between the high friction material used in the brake pad 32 and the rail material 16. As braking occurs, heat tends to become accumulated in the brake pad 32 which can deleteriously alter the friction coefficient $\mu_k$ between the pad material and rail material. If the heat becomes high enough for a given material, a substantial reduction in the hardness, as well as deformation or fusion of the high friction material may occur, which in turn may cause brake failure.

In the prior art, the brake pad 32 used in the brake system 10 to provide a friction surface has been formed from gray cast iron. Gray cast iron, while suitable for low speed, low load conditions, cannot operate as a consistent friction material at high speed and load conditions. In view of the short comings of gray cast iron in such applications, it has been found that the gray cast iron material used as the high friction material in pads 32 may be replaced with a molybdenum alloy material. A brake pad having a molybdenum alloy material according to the present invention, which will be described more fully below, is capable of operation under the conditions required for an elevator operating at contract speeds of up to 10 meters per second with a load rating of up to 16000 Kg. It has been further found that the pads made in accordance with the present invention have significant mechanical toughness, thermal shock resistance, negligible wear rates on rail steel and appreciable coefficient of friction on rail steel.

A 30 mm diameter plate formed from TZM molybdenum alloy No. 364 conforming to ASTM standard B 387-90 containing approximately 99.4 weight percent molybdenum, 0.5 weight percent titanium and 0.1 weight percent zirconium was attached to a steel substrate to form a 30 mm diameter test tile and the edges of the molybdenum alloy material were provided with a chamfer. The test tile was loaded with a normal force of 11,000 N against a rotating 2 meter diameter disk under conditions which were selected to simulate an emergency stop on a typical steel hoistway guide rail surface under high load and high velocity conditions. A frictional force of nearly 6,000 N was generated which indicates that the material had a nominal coefficient of friction with the rail steel of about 0.40 which is about 1.5 times that of typical gray cast iron grade 30. The TZM molybdenum alloy tile showed very little wear, about 1 percent of the wear exhibited by the typical gray cast iron grade 30. The rail damage caused by the molybdenum alloy was equivalent to the damage caused by grade 30 cast iron. The material performed adequately under all rail conditions simulated (clean rail, rusted rail, oiled rail, wet rail and roughened rail).

As illustrated in FIG. 2., the friction surface of the brake may be in the form of a plate 34 which is attached to the base 26. As illustrated in FIG. 3, a cross hatch pattern 36 may be machined therein to provide a topography to the friction surface. Referring to FIGS. 4 and 5, alternatively, the friction surface may be formed from a plurality of tiles 38 of the TZM alloy material. The tiles 38 may be attached to the base 26 directly via mechanical fasteners (not shown) or alternatively, the tiles may be attached to the base 26 via a compliant material interface 40 which enables resilient movement of the alloy friction material relative to the base 26 and allows a greater number of tiles to make contact with the rail surface in the event that the rail facing surface of the brake shoe base 26 is not perfectly true with the rail 16. Compliant material which may be used in the present invention includes heat resistant rubber like material such as heat resistant silcone. Like the single plate 34, one or more of the tiles 40 may be provided with a cross hatch pattern machined therein (not shown).

Referring to FIG. 6, the friction surface may also be formed from a plurality of pins 42 of the alloy material which are positioned so as to be generally transverse to the direction of relative movement between the friction surface and the guide rail surface. In most cases, these pins 42 are oriented horizontally in a elevator system, however, they need not be. The pins 42 may be attached to the base 26 via a compliant material interface in the manner shown for attachment of the tiles 38. The compliant material interface enables resilient movement of the pins 42 relative to the base 26.

Referring to FIGS. 7 and 8, in still yet another embodiment, the friction surface may be formed from a plurality of buttons 46 of the alloy material having a head 48 and a stem 50. Each of the heads 48 of the plurality of buttons 46 are held adjacent to the base 26 by a fastening plate 52 having a plurality of openings 54 wherein the plurality of stems 50 project therethrough.

As will be understood from the foregoing description, according to the present invention, several embodiments of a safety brake system for stopping an elevator have been described. The molybdenum alloy employed therein provides a high coefficient of friction which is advantageous in that lower normal forces and smaller, lighter springs and safeties can be employed. It is to be understood that the embodiments described herein are merely illustrative of the principles of the invention. Various modifications may be made thereto by persons skilled in the art which will embody the principles of the invention and fall within the spirit and scope thereof. Hence, the present invention is deemed limited only by the appended claims and the reasonable interpretation thereof.

What is claimed is:

1. An elevator safety brake for stopping an elevator car, the brake comprising:

a brake shoe having a base and further having a friction surface attached to the base for contacting an elevator guide rail surface, wherein at least a portion of the friction surface comprises an alloy material formed from approximately 99.4 weight percent molybdenum, 0.5 weight percent titanium and 0.1 weight percent zirconium; and means for pressing the friction material of the brake shoe against the guide rail surface to stop the elevator car.

2. The brake of claim 1, wherein the friction surface is a plate of the alloy material attached to the base.

3. The brake of claim 2, wherein the plate contains a cross hatch pattern machined therein.

4. The brake of claim 1, wherein the friction surface comprises a plurality of tiles of the alloy material.

5. The brake of claim 4, wherein at least one of the tiles contains a cross hatch pattern machined therein.

6. The brake of claim 4, wherein at least one of the tiles is attached to the base via a compliant material which enables resilient movement of the tile relative to the base.

7. The brake of claim 6, wherein the compliant material is a heat resistant rubber material.

8. The brake of claim 1, wherein the friction surface comprises a plurality of pins of the alloy material and wherein the plurality of pins are positioned so as to be substantially transverse to the direction of relative movement between the friction surface and the guide rail surface.

9. The brake of claim 8, wherein at least one of the pins is attached to the base via a compliant material which enables resilient movement of the pin relative to the base.

10. The brake of claim 9, wherein the compliant material is a heat resistant rubber material.

11. The brake of claim 1, wherein the friction surface comprises a plurality of buttons of the alloy material having a head and a stem, and wherein the heads of the plurality of buttons are held adjacent to the base by a fastening plate having a plurality of openings wherein the plurality of stems project therethrough.

* * * * *